United States Patent
Zhang et al.

(10) Patent No.: US 9,912,964 B2
(45) Date of Patent: Mar. 6, 2018

(54) METHOD OF TEXTURE DEPENDENT DEPTH PARTITION

(71) Applicant: HFI INNOVATION INC., Zhubei (TW)

(72) Inventors: Xianguo Zhang, Beijing (CN); Kai Zhang, Beijing (CN); Jicheng An, Beijing (CN); Jian-Liang Lin, Yilan County (CN)

(73) Assignee: HFI INNOVATION INC., Zhubei (TW)

( * ) Notice: Subject to any disclaimer, the term of this patent is extended or adjusted under 35 U.S.C. 154(b) by 232 days.

(21) Appl. No.: 14/582,045

(22) Filed: Dec. 23, 2014

(65) Prior Publication Data

US 2015/0195570 A1 Jul. 9, 2015

Related U.S. Application Data

(63) Continuation-in-part of application No. PCT/CN2014/070084, filed on Jan. 3, 2014.

(51) Int. Cl.
*H04N 19/597* (2014.01)
*H04N 19/517* (2014.01)
(Continued)

(52) U.S. Cl.
CPC ......... *H04N 19/597* (2014.11); *H04N 19/119* (2014.11); *H04N 19/157* (2014.11); *H04N 19/176* (2014.11); *H04N 19/517* (2014.11)

(58) Field of Classification Search
None
See application file for complete search history.

(56) References Cited

U.S. PATENT DOCUMENTS

| | | | |
|---|---|---|---|
| 2013/0163664 A1* | 6/2013 | Guo | H04N 19/00793 375/240.12 |
| 2013/0188731 A1* | 7/2013 | Kim | H04N 19/70 375/240.18 |

(Continued)

FOREIGN PATENT DOCUMENTS

| | | |
|---|---|---|
| CN | 103413276 A | 11/2013 |
| TW | 201334566 | 8/2013 |
| WO | WO 2013/096772 | 6/2013 |

OTHER PUBLICATIONS

Chinese Office Action dated Jun. 19, 2017 in Chinse Patent Application No. 201410654199.X with English translation, 9 pages.

*Primary Examiner* — Mohammad J Rahman
(74) *Attorney, Agent, or Firm* — Oblon, McClelland, Maier & Neustadt, L.L.P.

(57) ABSTRACT

A method of improved texture-partition-dependent depth partition is disclosed. First, the available texture partitions for a collocated texture block are classified into two or more groups, and a set of candidate depth partitions is determined for each group. In one embodiment, at least one set of the candidate depth partitions contain more than one candidate depth partition and less than all candidate depth partitions. In another embodiment, the collocated texture blocks are classified into two groups, and one of the two groups includes the N×N texture partition and at least another texture partition. In yet another embodiment, the collocated texture blocks are classified into three groups or more. A current depth partition for the current depth block is then selected from a corresponding set of candidate depth partitions according to a corresponding group that a current texture partition associated with the collocated texture block belongs.

23 Claims, 3 Drawing Sheets

(51) Int. Cl.
  *H04N 19/176*  (2014.01)
  *H04N 19/119*  (2014.01)
  *H04N 19/157*  (2014.01)

(56) References Cited

U.S. PATENT DOCUMENTS

| | | | |
|---|---|---|---|
| 2014/0098882 A1* | 4/2014 | Zhang | H04N 13/0048 375/240.16 |
| 2014/0321547 A1 | 10/2014 | Takehara et al. | |
| 2015/0264397 A1* | 9/2015 | Lin | H04N 19/597 375/240.16 |
| 2015/0326880 A1* | 11/2015 | He | H04N 19/597 375/240.13 |
| 2016/0165263 A1* | 6/2016 | Zhang | H04N 19/597 375/240.12 |

* cited by examiner

METHOD OF TEXTURE DEPENDENT DEPTH PARTITION

CROSS REFERENCE TO RELATED APPLICATIONS

The present invention is a continuation-in-part of and claims priority to PCT Patent Application, Serial No. PCT/CN2014/070084, filed on Jan. 3, 2014, entitled "Methods for Determining the Prediction Partitions". The PCT Patent Application is hereby incorporated by reference in its entirety.

FIELD OF THE INVENTION

The present invention relates to three-dimensional video coding. In particular, the present invention relates to depth partitioning utilizing information related to texture partition of the collocated texture block.

BACKGROUND AND RELATED ART

Three-dimensional (3D) video coding is developed for encoding or decoding video data of multiple views simultaneously captured by multiple cameras. Since all cameras capture the same scene for both the texture data and depth data, there is a large amount of redundancy between texture and depth data in the same view. According to HEVC, the coding process is applied to each block, named as coding unit (CU) and each CU is subject to prediction process. Each CU may be divided into one or more prediction units (PUs) and the prediction process, such as Intra or Inter prediction, is applied to each PU. To reduce the redundancy, a texture-partition-dependent depth partition is utilized for processing a current depth block collocated with a collocated texture CU at the same quad-tree level according to the current 3D-HEVC (3D video coding based on high efficiency video coding (HEVC)).

Figure 1:
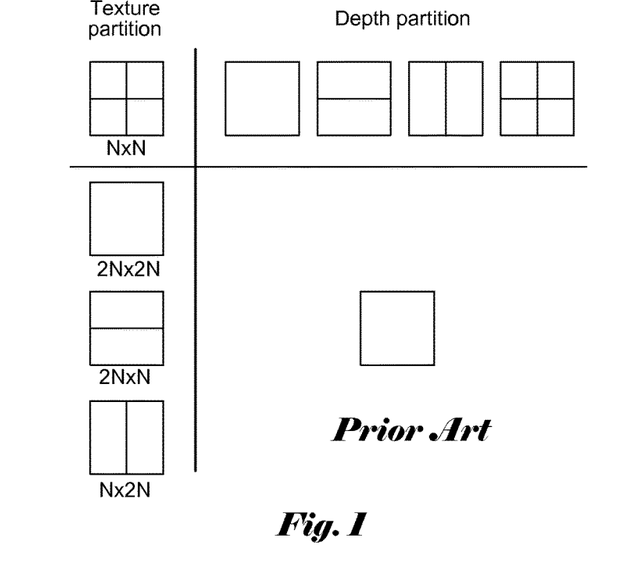
FIG. 1 illustrates an example of texture-partition-dependent depth partition according to existing 3D-HEVC (three-dimensional video coding based on HEVC (High Efficiency Video Coding)).

In order to simplify the texture-partition-dependent depth partition, limitation on the quad-tree based depth partition is imposed, which restricts the quad-tree for the depth partition no deeper than the quad-tree for the texture partition. Without this restriction, the depth partition may require too much coding time and may cause increased BD-rate, where BD-rate represents a rate-distortion performance measure often used for video coding. The texture-partition-dependent depth coding according to the conventional method is shown in FIG. 1, where a 2N×2N texture prediction unit (PU) can be partitioned into a 2N×2N, 2N×N, N×2N or N×N PU. However, when the texture PU is partitioned into 2N×2N, N×2N or 2N×N blocks, the corresponding depth partition size will be always 2N×2N as shown in FIG. 1.

Figure 2:
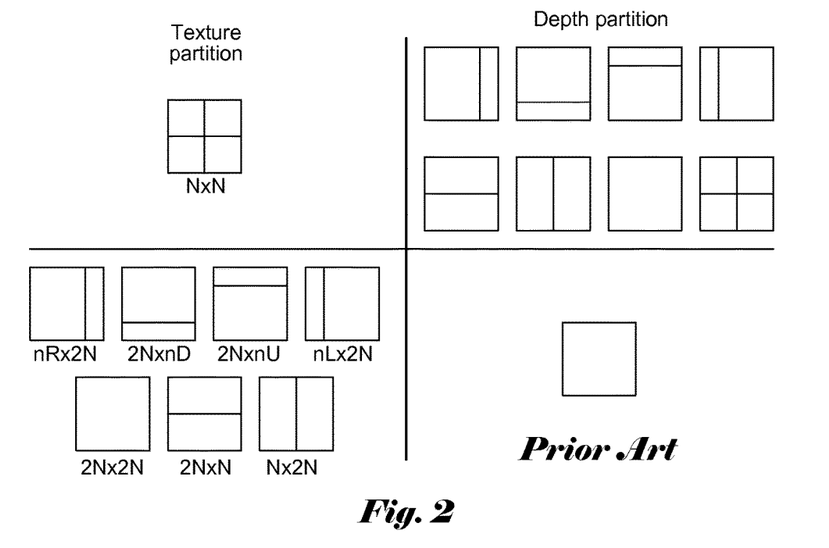
FIG. 2 illustrates an example of texture-partition-dependent depth partition according to existing 3D-HEVC (three-dimensional video coding based on HEVC (High Efficiency Video Coding)), where the partitions include AMP (Asymmetric Motion Partition).

While the quad-tree partition is always symmetric in the early HEVC development, asymmetric motion partition (AMP) was introduced into HEVC later. AMP partitions include 2N×nU, 2N×nD, nL×2N and nR×2N as shown in FIG. 2. According to the conventional 3D-HEVC, when the texture PU is partitioned into N×N blocks, the current texture-partition-dependent depth partition allows the depth block to be partitioned into any of the allowed candidate depth partitions as shown in FIG. 2. However, the 2N×2N partition is the only candidate depth partition for all other texture block sizes.

There are some issues with the conventional texture-partition-dependent depth partition. First, the original method was developed before AMP is utilized for motion partition in HEVC. Therefore, the partition distribution between texture and depth shown in FIG. 2 appears to be skewed, where a full candidate depth partition set is allowed for one texture partition (i.e., N×N) while a single candidate depth partition candidate (i.e., 2N×2N) is allowed for the rest of the texture partitions. Furthermore, the depth partition candidate is so limited (i.e., single 2N×2N candidate) for all texture partition sizes other than N×N, it may degrade the coding efficiency of the depth data and have negative impact on the quality of coded depth data. Consequently, coding tools such as VSP that rely on the reconstructed depth data may also be impacted to lower picture quality. Therefore, it is desirable to develop improved texture-partition-dependent depth partition to overcome these issues.

BRIEF SUMMARY OF THE INVENTION

A method of depth block coding for a three-dimensional video coding system incorporating improved texture-partition-dependent depth partition according to the present invention is disclosed. First, the available texture partitions for a collocated texture block are classified into two or more groups, and a set of candidate depth partitions is determined for each group. In one embodiment, at least one set of the candidate depth partitions contain more than one candidate depth partition and less than all candidate depth partitions. In another embodiment, the collocated texture blocks are classified into two groups, and one of the two groups includes the N×N texture partition and at least another texture partition. In yet another embodiment, the collocated texture blocks are classified into three groups or more. A current depth partition for the current depth block is then selected from a corresponding set of candidate depth partitions according to a corresponding group that a current texture partition associated with the collocated texture block belongs. After the current depth partition for the current depth block is selected, the current depth block is encoded or decoded according to the current depth partition.

In one embodiment, a group consists of all horizontal texture partitions and the set of candidate depth partitions for the group consist of all horizontal candidate depth partitions and a 2N×2N candidate depth partition. In another embodiment, a group consists of all vertical texture partitions and the set of candidate depth partitions for the group consist of all vertical candidate depth partitions and a 2N×2N candidate depth partition. In yet another embodiment, the available texture partitions for the collocated texture block are classified into a first group and a second group, the first group consists of all asymmetric texture motion partitions and the N×N texture partition, and the second group consists of 2N×2N, N×2N and 2N×N texture partitions. The set of candidate depth partitions for the first group consist of all candidate depth partitions, and the set of candidate depth partitions for the second group consist of a 2N×2N candidate depth partition.

In one embodiment, a group comprises one or more asymmetric texture motion partitions. The set of candidate depth partitions for the group corresponds to a first set or a second set. The first set consists of all candidate depth partitions and the second set consists of all candidate depth partitions except for an N×N candidate depth partition, all asymmetric candidate depth motion partitions, or both the N×N candidate depth partition and all candidate asymmetric depth motion partitions. In another embodiment, the first set consists of a corresponding candidate depth partition and a 2N×2N candidate depth partition and the second set consists of the corresponding candidate depth partition, the 2N×2N candidate depth partition, an N×2N candidate depth partition and a 2N×N candidate depth partition. The corresponding candidate depth partition corresponds to the current texture partition associated with the collocated texture block.

In one embodiment, a group comprises one or more texture partitions that are partitioned into two parts. The set of candidate depth partitions for the group corresponds to a first set or a second set. The first set consists of all candidate depth partitions and the second set consists of all candidate depth partitions except for an N×N candidate depth partition, all candidate asymmetric depth motion partitions, or both the N×N candidate depth partition and all candidate asymmetric depth motion partitions. In another embodiment, the first set consists of a corresponding candidate depth partition and a 2N×2N candidate depth partition and the second set consists of the corresponding candidate depth partition, the 2N×2N candidate depth partition, an N×2N candidate depth partition and a 2N×N candidate depth partition. The corresponding candidate depth partition corresponds to the current texture partition associated with the collocated texture block.

In one embodiment, a group comprises one or more texture partitions that are partitioned along a same direction. The set of candidate depth partitions for the group comprises a corresponding candidate depth partition and a 2N×2N candidate depth partition. The corresponding candidate depth partition corresponds to the current texture partition associated with the collocated texture block. Furthermore, when the collocated texture block uses a horizontal texture partition, the set of candidate depth partitions for the group corresponds to a first set or a second set. The first set consists of the 2N×2N candidate depth partition and all horizontal candidate depth partitions and the second set consists of the 2N×2N candidate depth partition and all horizontal candidate depth partitions except for candidate asymmetric depth motion partitions. When the collocated texture block uses a vertical texture partition, the set of candidate depth partitions for the group corresponds to a first set or a second set. The first set consists of the 2N×2N candidate depth partition and all vertical candidate depth partitions and the second set consists of the 2N×2N candidate depth partition and all vertical candidate depth partitions except for candidate asymmetric depth motion partitions.

In one embodiment, when the collocated texture block uses a vertical texture partition, the set of candidate depth partitions for the current depth block corresponds to a first set, a second set or a third set. The first set consist of one or more vertical candidate depth partitions, the second set consists of said one or more vertical candidate depth partitions and a 2N×2N candidate depth partition, and the third set consists of said one or more vertical candidate depth partitions and an N×N candidate depth partition. When the collocated texture block uses a horizontal texture partition, the set of candidate depth partitions for the current depth block corresponds to a first set, a second set or a third set. The first set consist of one or more horizontal candidate depth partitions, the second set consists of said one or more horizontal candidate depth partitions and a 2N×2N candidate depth partition, and the third set consists of said one or more horizontal candidate depth partitions and an N×N candidate depth partition.

In one embodiment, at least one set of candidate depth partitions is coded using a binarization process. The candidate depth partitions of said at least one set of candidate depth partitions are binarized according to an order associated with each of the candidate depth partitions of said at least one set of candidate depth partitions. For example, said at least one set of candidate depth partitions may correspond to {2N×2N, 2N×N, 2N×nU and 2N×nD} and a corresponding binarization set is selected from a binarization group consisting of {1, 01, 000, 001}, {1, 00, 010, 011}, {1, 01, 001, 000}, {1, 00, 011, 010}, {0, 11, 100, 101}, {0, 10, 110, 111}, {0, 11, 101, 100}, and {0, 10, 111, 110}.

DETAILED DESCRIPTION OF THE INVENTION

In order to overcome the issues in the conventional texture-partition-dependent depth partition, an improved depth partition method by increasing allowed candidate depth partitions for corresponding non-N×N texture partitions, increasing the number of groups of texture partitions for texture partition dependency, or a combination of both.

Figure 3:
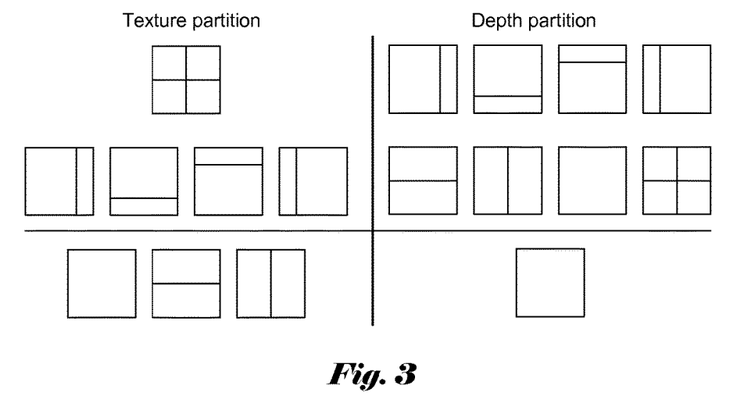
FIG. 3 illustrates an example of improved texture-partition-dependent depth partition according to an embodiment of the present invention, where the available texture partitions are classified into a first group and a second group, the first group consists of N×N and AMP texture partitions and the second group consists of the remaining texture partitions.

According to one embodiment, more depth partitions are allowed for a depth block when a collocated texture CU is predicted by non-N×N partitions. For example, while all 8 candidate depth partitions are allowed for a depth block when a collocated texture block is partitioned into N×N, an embodiment of the present invention allows a depth block having the collocated texture block partitioned into other sizes to use all 8 partitions as well. The other texture partition sizes may correspond to the sizes from AMP, i.e., 2N×nU, 2N×nD, nL×2N and nR×2N as shown in FIG. 3. When the collocated texture block partitioned into 2N×2N, 2N×N or N×2N, only one partition candidate, i.e., 2N×2N is allowed as shown in FIG. 3. The example illustrated in FIG. 3 describes one embodiment of the present invention, where the available texture partitions associated with the collocated texture block are classified into two groups. The first group includes N×N and all AMP partitions (i.e., 2N×nU, 2N×nD, nL×2N and nR×2N). The second group includes 2N×2N, 2N×N and N×2N texture partitions. The allowable depth partitions for the depth block associated with the collocated texture block belonging to the first group include all 8 candidate depth partitions. The allowable depth partitions for the depth block associated with the collocated texture block belonging to the second group include only 1 depth partition (i.e., 2N×2N). Nevertheless, more than two groups may be used to classify the texture partition of the collocated texture block.

Figure 4:
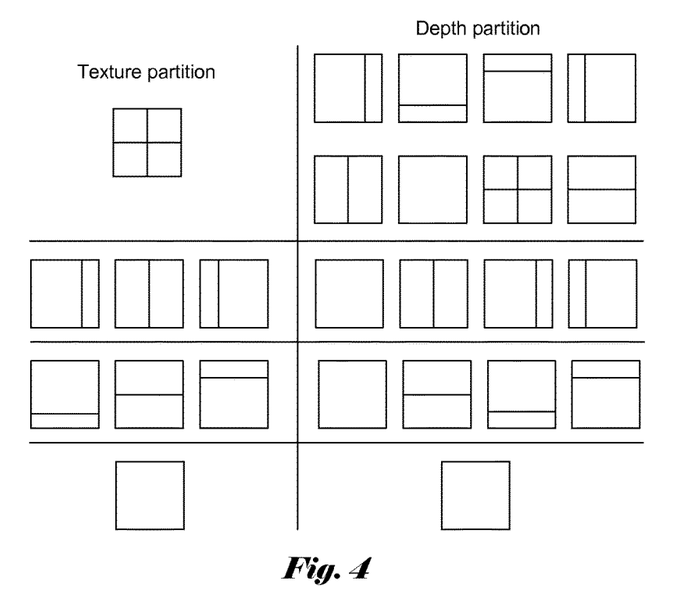
FIG. 4 illustrates another example of improved texture-partition-dependent depth partition according to an embodiment of the present invention, where the available texture partitions are classified into four groups including one group consisting of all vertical texture partitions and another group consisting of all horizontal texture partitions.

While the N×N and AMP texture partitions are assigned to the first group and the remaining texture partitions are assigned to the second group, other partition classification may also be used. Further, while all 8 candidate depth partitions are allowed for the first group and only 2N×2N depth partition is allowed for the second group, other sets of candidate depth partitions may also be used to practice the present invention. In other words, embodiments of the present invention may use a set of candidate depth partitions having more than 1 candidate depth partition, but less than 8 candidate depth partitions. According to one embodiment of the present invention, classifying the texture partitions into groups may be dependent on the texture partition direction. In another embodiment, a set of candidate depth partitions can be formed depending on the partition direction. For example, a group may consist of vertical texture partitions or horizontal texture partitions only. Also, a set of vertical/horizontal candidate depth partitions can be used for a corresponding group. Furthermore, one or more additional depth partitions, such as 2N×2N may be added to the set of vertical/horizontal candidate depth partitions. For example, when the collocated texture block is predicted using vertical partitions (i.e., N×2N, nR×2N and nL×2N), the candidate depth partitions for depth partition include 2N×2N and the vertical depth partitions (i.e., N×2N, nR×2N and nL×2N) as shown in FIG. 4. Also, when the collocated texture block is predicted using horizontal partitions (i.e., 2N×N, 2N×nU and 2N×nD), the candidate partitions for depth partition include 2N×2N and the horizontal partitions (i.e., 2N×N, 2N×nU and 2N×nD). As shown in FIG. 4, the 2N×2N and N×N partitions of the collocated texture block are classified into their own individual groups. The sets of candidate depth partition for the 2N×2N and N×N partitions are the same as the conventional texture-partition-dependent depth partition. Accordingly, the example in FIG. 4 consists of 4 groups associated with the available texture partitions of the collocated texture block.

The set of candidate depth partitions for a current depth can be formed depending on the quad-tree level of the collocated texture block. While the method based on the conventional 3D-HEVC relies on the texture partition of the collocated texture block in a same quad-tree level, embodiment of the present invention can also rely on the texture partition of the collocated texture block in other quad-tree levels.

The examples incorporating embodiments of the present invention in FIG. 3 and FIG. 4 are intended to illustrate exemplary texture partition groups and sets of candidate depth partitions. They should not be construed as limitations of the present invention. Other texture partition groups and sets of candidate depth partitions may also be used to practice the present invention. For example, the group may include one or more AMP texture partitions. When the texture partition of the collocated texture block corresponds to an AMP partition, the set of candidate depth partitions may include all candidate depth partitions. One or more candidate depth partitions can be removed from the set. For example, the N×N partition, the AMP partitions, or both the N×N partition and the AMP partitions can be removed from the set. In another example, the 2N×2N partition, the AMP partitions, or both the 2N×2N partition and the AMP partitions can be removed from the set.

In one embodiment, the group may include one or more texture partitions that are partitioned into two parts (e.g., 2N×N, N×2N or the AMP partitions). When the texture partition of the collocated texture block corresponds to a texture partition partitioned into two parts, the set of candidate depth partitions may include all candidate depth partitions. One or more candidate depth partitions can be removed from the set. For example, the N×N partition, the AMP partitions, or both the N×N partition and the AMP partitions can be removed from the set. In another example, the 2N×2N partition, the AMP partitions, or both the 2N×2N partition and the AMP partitions can be removed from the set.

In one embodiment, the group may include one or more texture partitions that are partitioned along a same direction. When the texture partition of the collocated texture block belongs to this group, the set of candidate depth partitions may comprise a corresponding candidate depth partition and a 2N×2N candidate depth partition. The corresponding candidate depth partition corresponds to the current texture partition associated with the collocated texture block. Furthermore, the set of candidate depth partitions for the first group corresponds to a first set or a second set when the collocated texture block uses a horizontal texture partition. The first set consists of the 2N×2N candidate depth partition and all horizontal candidate depth partitions and the second set consists of the 2N×2N candidate depth partition and all horizontal candidate depth partitions except for candidate asymmetric depth motion partitions when the collocated texture block uses a horizontal texture partition. When the collocated texture block uses a vertical texture partition, the first set consists of the 2N×2N candidate depth partition and all vertical candidate depth partitions and the second set consists of the 2N×2N candidate depth partition and all vertical candidate depth partitions except for candidate asymmetric depth motion partitions when the collocated texture block uses a horizontal texture partition.

In one embodiment, the set of candidate depth partitions for the current depth block corresponds to a first set, a second set or a third set when the collocated texture block uses a vertical texture partition. The first set consist of one or more vertical candidate depth partitions, the second set consists of said one or more vertical candidate depth partitions and a 2N×2N candidate depth partition, and the third set consists of said one or more vertical candidate depth partitions and an N×N candidate depth partition.

In one embodiment, the set of candidate depth partitions for the current depth block corresponds to a first set, a second set or a third set when the collocated texture block uses a horizontal texture partition. The first set consist of one or more horizontal candidate depth partitions, the second set consists of said one or more horizontal candidate depth partitions and a 2N×2N candidate depth partition, and the third set consists of said one or more horizontal candidate depth partitions and an N×N candidate depth partition.

In one embodiment, the candidate depth partition set is coded using a binarization process. The candidate depth partitions of the set can be binarized according to an order associated with each of the candidate depth partitions of said at least one set of candidate depth partitions. For example, the set may correspond to {2N×2N, 2N×N, 2N×nU and 2N×nD} and a corresponding binarization set is selected from a binarization group consisting of {1, 01, 000, 001}, {1, 00, 010, 011}, {1, 01, 001, 000}, {1, 00, 011, 010}, {0, 11, 100, 101}, {0, 10, 110, 111}, {0, 11, 101, 100}, and {0, 10, 111, 110}.

Figure 5:
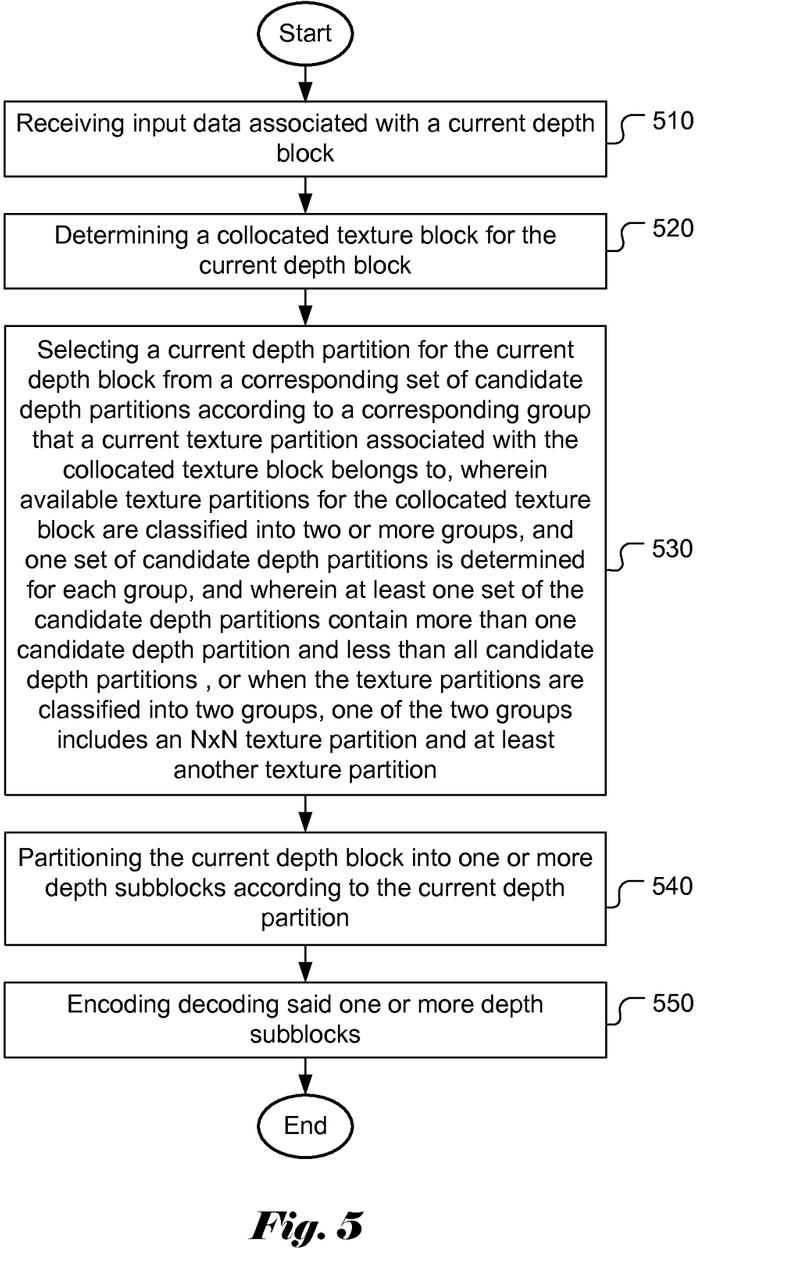
FIG. 5 illustrates an exemplary flowchart of improved texture-partition-dependent depth partition incorporating an embodiment of the present invention, where at least one set of the candidate depth partitions contain more than one candidate depth partition and less than all candidate depth partitions, or when the texture partitions are classified into two groups, one of the two groups includes an N×N texture partition and at least another texture partition.

The performance of a system incorporating an embodiment of the present invention is compared to that of a conventional system. The system incorporating an embodiment of the present invention uses the improved texture-partition-dependent depth partition as shown in FIG. 4. The conventional system is based on HTM-9.0 (Test Model of 3D video coding based on HEVC, version 9.0). Table 1 illustrates the performance comparison conducted under the common test condition (CTC) as defined for HTM. The performance comparison is based on different sets of test data listed in the first column. The BD-rate differences are shown for texture pictures in view 1 (video 1) and view 2 (video 2). A negative value in the BD-rate implies that the present invention has a better performance. As shown in Table 1, BD-rate measure for view 1 and view 2 is about the same or slightly improved compared to the conventional HTM-9.0. The BD-rate measure for the coded video PSNR with video bitrate, the coded video PSNR with total bitrate (texture bitrate and depth bitrate) and the synthesized video PSNR with total bitrate are also compared. The synthesized video PSNR with total bitrate shows 0.2% BD-rate reduction. The processing times (encoding time, decoding time and rendering time) all show some improvement (1 to 2%).

current depth block is partitioned into one or more depth subblocks according to the current depth partition in step 540. Encoding or decoding is then applied to said one or more depth subblocks in step 550.

The flowchart shown above is intended to illustrate examples of improved texture-partition-dependent depth partition according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

TABLE 1

|  | Video 0 | Video 1 | Video 2 | Video PSNR/video bitrate | Video PSNR/total bitrate | Synth PSNR/total bitrate | Enc time | Dec time | Ren time |
|---|---|---|---|---|---|---|---|---|---|
| Balloons | 0.0% | 0.0% | −0.1% | 0.0% | 0.0% | −0.1% | 99.9% | 96.5% | 97.2% |
| Kendo | 0.0% | −0.1% | −0.1% | 0.0% | 0.0% | −0.2% | 98.6% | 106.7% | 100.9% |
| Newspapercc | 0.0% | −0.1% | 0.1% | 0.0% | 0.0% | −0.1% | 98.0% | 97.1% | 100.2% |
| GhostTownFly | 0.0% | 0.0% | 0.0% | 0.0% | 0.1% | −0.2% | 97.1% | 95.0% | 100.1% |
| PoznanHall2 | 0.0% | 0.0% | 0.1% | 0.0% | 0.1% | −0.2% | 97.7% | 99.1% | 97.0% |
| PoznanStreet | 0.0% | −0.1% | −0.1% | 0.0% | 0.0% | 0.0% | 99.1% | 94.6% | 96.8% |
| UndoDancer | 0.0% | 0.0% | 0.0% | 0.0% | 0.0% | −0.3% | 98.2% | 100.0% | 100.2% |
| Shark | 0.0% | 0.0% | −0.1% | 0.0% | 0.0% | −0.1% | 95.5% | 95.3% | 99.3% |
| 1024 × 768 | 0.0% | −0.1% | 0.0% | 0.0% | 0.0% | −0.2% | 98.8% | 100.1% | 99.4% |
| 1920 × 1088 | 0.0% | 0.0% | −0.1% | 0.0% | 0.0% | −0.2% | 97.5% | 96.8% | 98.7% |
| average | 0.0% | 0.0% | 0.0% | 0.0% | 0.0% | −0.2% | 98.0% | 98.0% | 99.0% |

FIG. 5 illustrates an exemplary flowchart of a three-dimensional video coding system incorporating improved texture-partition-dependent depth partition according to an embodiment of the present invention. The system receives input data associated with a current depth block as shown in step 510. For encoding, the input data corresponds to depth data to be encoded. For decoding, the input data corresponds to coded depth data to be decoded. The input data may be retrieved from memory (e.g., computer memory, buffer (RAM or DRAM) or other media) or from a processor. A collocated texture block for the current depth block is determined in step 520. A current depth partition for the current depth block is selected from a corresponding set of candidate depth partitions according to a corresponding group that a current texture partition associated with the collocated texture block belongs as shown in step 530. The available texture partitions for the collocated texture block are classified into two or more groups, and one set of candidate depth partitions is determined for each group. At least one set of the candidate depth partitions contain more than one candidate depth partition and less than all candidate depth partitions, or when the texture partitions are classified into two groups, one of the two groups includes an N×N texture partition and at least another texture partition. The Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding a depth block in a three-dimensional video coding system, the method comprising:
    receiving input data associated with a current depth block;
    determining a collocated texture block for the current depth block, the collocated texture block being partitioned based on a current texture partition candidate selected from a plurality of available texture partition candidates, and the available texture partition candidates being classified into two or more groups:
    identifying a corresponding set of depth partition candidates from two or more sets of depth partition candidates based on a group the current texture partition candidate belongs, each one of the two or more sets of depth partition candidates being associated with a respective one of the two or more groups, and the two or more sets of depth partition candidates collectively provide a plurality of available depth partition candidates;
    selecting a current depth partition candidate for partitioning the current depth block from the identified set of depth partition candidates;
    partitioning the current depth block into one or more depth subblocks according to the current depth partition candidate; and
    encoding or decoding the one or more depth subblocks, wherein
    at least one of the two or more sets of depth partition candidates includes more than one depth partition candidate and less than all of the available depth partition candidates, or
    when the available texture partition candidates are classified into two groups, one of the two groups includes an N×N texture partition candidate and at least another texture partition candidate.

2. The method of claim 1, wherein a first group of the two or more groups consists of all vertical texture partition candidates among the available texture partition candidates, and the corresponding set of depth partition candidates associated with the first group consists of all vertical depth partition candidates among the available depth partition candidates and a 2N×2N depth partition candidate.

3. The method of claim 1, wherein a first group of the two or more groups consists of all horizontal texture partition candidates among the available texture partition candidates, and the corresponding set of depth partition candidates associated with the first group consists of all horizontal depth partition candidates among the available depth partition candidates and a 2N×2N depth partition candidate.

4. The method of claim 1, wherein the available texture partition candidates for the collocated texture block are classified into a first group and a second group, the first group consists of all asymmetric texture partition candidates among the available texture partition candidates and the N×N texture partition candidate, and the second group consists of 2N×2N, N×2N, and 2N×N texture partition candidates.

5. The method of claim 4, wherein a first set of depth partition candidates associated with the first group consists of all of the available depth partition candidates, and a second set of depth partition candidates associated with the second group consists of a 2N×2N depth partition candidate.

6. The method of claim 1, wherein a first group of the two or more groups comprises one or more asymmetric texture partition candidates among the available texture partition candidates.

7. The method of claim 6, wherein a set of depth partition candidates associated with the first group consists of all of the available depth partition candidates, or consists of all of the available depth partition candidates except for (a) an N×N depth partition candidate, (b) all asymmetric depth partition candidates among the available depth partition candidates, or (c) both the N×N candidate depth partition and all the asymmetric depth partition candidates.

8. The method of claim 6, wherein a set of depth partition candidates associated with the first group consists of a corresponding depth partition candidate and a 2N×2N depth partition candidate, or consists of the corresponding depth partition candidate, the 2N×2N depth partition candidate, an N×2N depth partition candidate, and a 2N×N depth partition candidate, wherein the corresponding depth partition candidate corresponds to the current texture partition candidate.

9. The method of claim 1, wherein a first group of the two or more groups comprises one or more texture partition candidates that corresponds to partitioning a block into two parts.

10. The method of claim 9, wherein a set of depth partition candidates associated with the first group consists of all of the available depth partition candidates, or consists of all of the available depth partition candidates except for (a) an N×N depth partition candidate, (b) all asymmetric depth partition candidates, or (c) both the N×N depth partition candidate and all the asymmetric depth partition candidates.

11. The method of claim 9, wherein a set of depth partition candidates associated with the first group consists of a corresponding depth partition candidate and a 2N×2N depth partition candidate, or consists of the corresponding depth partition candidate, the 2N×2N depth partition candidate, an N×2N depth partition candidate, and a 2N×N depth partition candidate, wherein the corresponding depth partition candidate corresponds to the current texture partition candidate.

12. The method of claim 1, wherein a first group comprises two or more texture partition candidates that corresponds to partitioning a block along a same direction.

13. The method of claim 12, wherein a set of depth partition candidates associated with the first group comprise a corresponding depth partition candidate and a 2N×2N depth partition candidate, wherein the corresponding depth partition candidate corresponds to the current texture partition candidate.

14. The method of claim 13, wherein the set of depth partition candidates associated with the first group consists of the 2N×2N depth partition candidate and all horizontal depth partition candidates among the available depth partitioning candidates, or consists of the 2N×2N depth partition candidate and all the horizontal depth partition candidates except for asymmetric depth partition candidates among the available depth partitioning candidates when the current texture partition candidate is a horizontal texture partition candidate.

15. The method of claim 13, wherein the set of depth partition candidates associated with the first group consists of the 2N×2N depth partition candidate and all vertical depth partition candidates among the available depth partitioning candidates, or consists of the 2N×2N depth partition candidate and all the vertical depth partition candidates except for asymmetric depth partition candidates among the available depth partitioning candidates when the current texture partition candidate is a vertical texture partition candidate.

16. The method of claim 1, wherein
the current texture partition candidate is a vertical texture partition candidate, and
the identified set of depth partition candidates for the current depth block consists of one or more vertical depth partition candidates among the available depth partitioning candidates, or consists of the one or more vertical depth partition candidates and a 2N×2N depth partition candidate, or consists of the one or more vertical depth partition candidates and an N×N depth partition candidate.

17. The method of claim 1, wherein
the current texture partition candidate is a horizontal texture partition candidate, and
the identified set of depth partition candidates for the current depth block consists of one or more horizontal depth partition candidates among the available depth partitioning candidates, or consists of the one or more horizontal depth partition candidates and a 2N×2N depth partition candidate, or consists of the one or more horizontal depth partition candidates and an N×N depth partition candidate.

18. The method of claim 1, wherein at least one set of the two or more sets of depth partition candidates is coded using a binarization process.

19. The method of claim 18, wherein depth partition candidates included in the at least one set of the two or more sets of depth partition candidates are binarized according to an order associated with each of the depth partition candidates included in the at least one set of the two or more sets of depth partition candidates.

20. The method of claim 19, wherein
the at least one set of the two or more sets of depth partition candidates corresponds to {2N×2N, 2N×N, 2N×NU, and 2N×ND}, and
a corresponding binarization set is selected from a binarization group consisting of {1, 01, 000, 001}, {1, 00, 010, 011}, {1, 01, 001, 000}, {1, 00, 011, 010}, {0, 11, 100, 101}, {0, 10, 110, 111}, {0, 11, 101, 100}, and {0, 10, 111,110}.

21. The method of claim 1, wherein the identifying the corresponding set of depth partition candidates is performed based on a quadtree-level of the collocated texture block.

22. The method of claim 1, wherein the identifying the corresponding set of depth partition candidates is performed independent of a quadtree-level of the collocated texture block.

23. An apparatus for coding a depth block in a three-dimensional video coding system, the apparatus comprising one or more electronic circuits configured to:
receive input data associated with a current depth block;
determine a collocated texture block for the current depth block, the collocated texture block being partitioned based on a current texture partition candidate selected from a plurality of available texture partition candidates, and the available texture partition candidates being classified into two or more groups;
identify a corresponding set of depth partition candidates from two or more sets of depth partition candidates based on a group the current texture partition candidate belongs, each one of the two or more sets of depth partition candidates being associated with a respective one of the two or more groups, and the two or more sets of depth partition candidates collectively provide a plurality of available depth partition candidates;
select a current depth partition candidate for partitioning the current depth block from the identified set of depth partition candidates;
partition the current depth block into one or more depth subblocks according to the current depth partition candidate; and
encode or decode the one or more depth subblocks, wherein
at least one of the two or more sets of depth partition candidates includes more than one depth partition candidate and less than all of the available depth partition candidates, or
when the available texture partition candidates are classified into two groups, one of the two groups includes an N×N texture partition candidate and at least another texture partition candidate.

* * * * *